Feb. 7, 1961  D. C. ENGELBART  2,971,123
ELECTRONIC DISCHARGE DEVICE
Filed Oct. 30, 1958  3 Sheets-Sheet 1
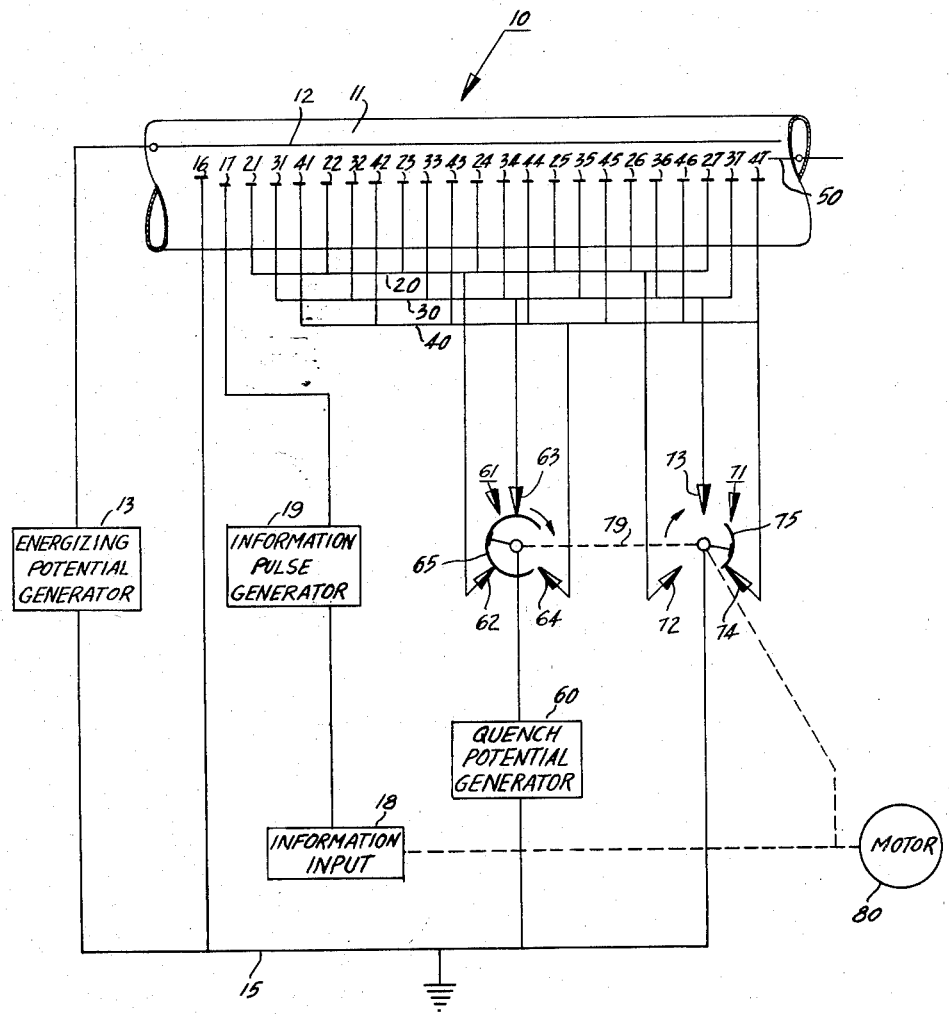
fig-1-
INVENTOR.
DOUGLAS C. ENGELBART
BY Samuel E. Turner
AGENT

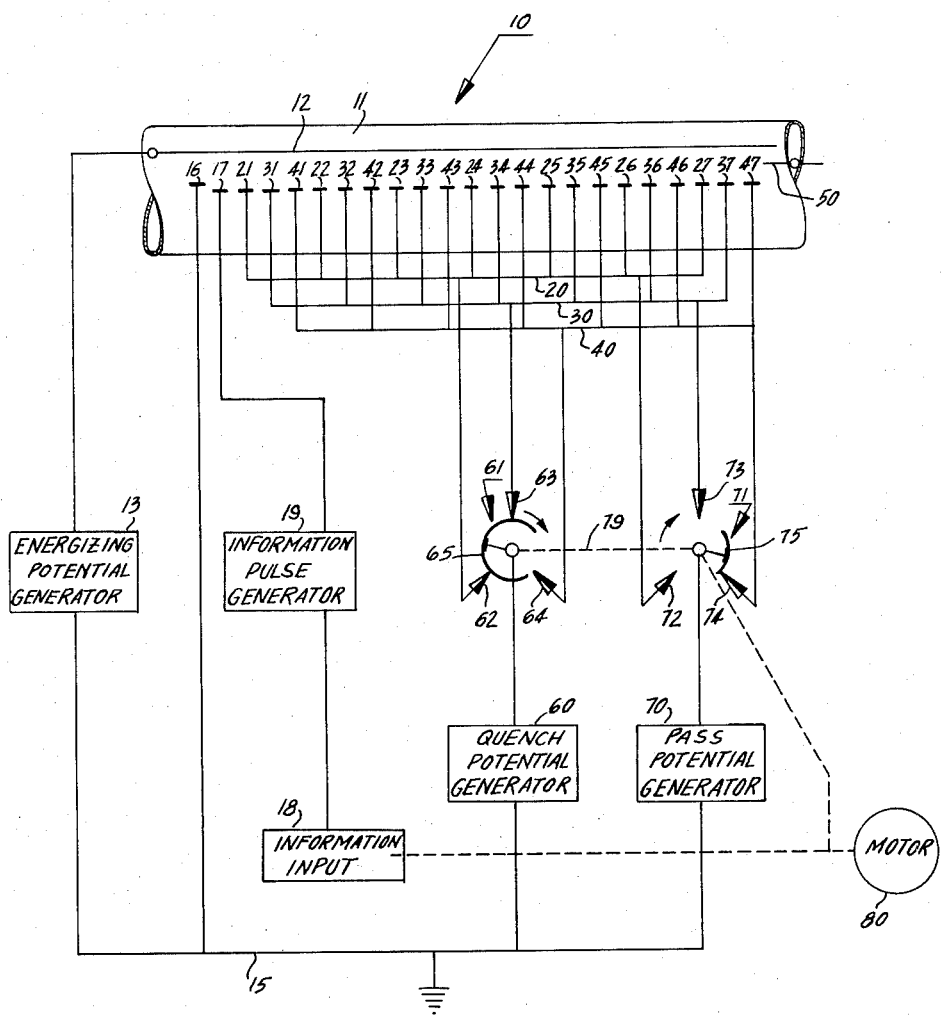
Fig_2_

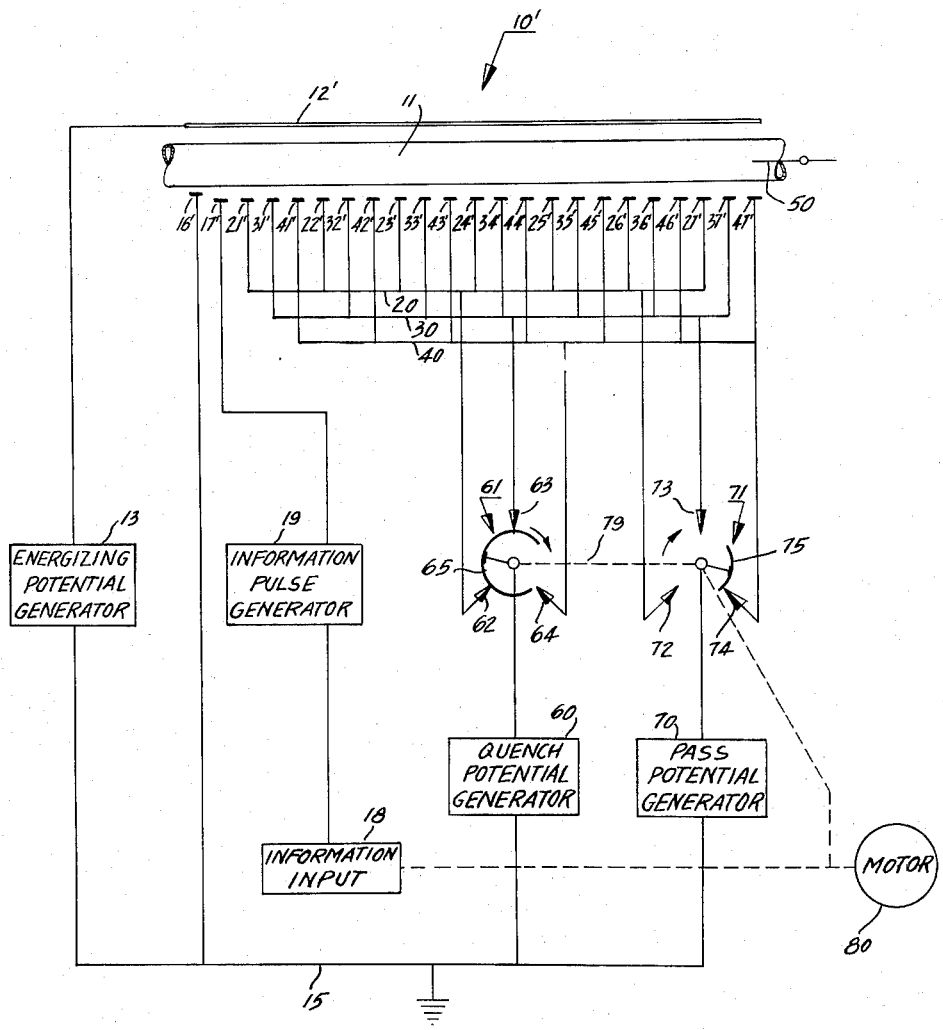

2,971,123

ELECTRONIC DISCHARGE DEVICE

Douglas C. Engelbart, Palo Alto, Calif., assignor to Digital Techniques, Inc., a corporation of California Filed Oct. 30, 1958, Ser. No. 770,664

5 Claims. (Cl. 315—84.6)

The invention relates to gaseous discharge devices and more particularly to a gaseous discharge shift register wherein a pattern of gaseous discharges may be shifted and/or sustained.

This application is a continuation-in-part of the copending applications, Serial No. 521,555, filed July 12, 1955, for Electric Discharge Device, now U.S. Patent No. 2,923,853, issued February 2, 1960; Serial No. 588,021, filed May 29, 1956, for Glow Discharge Device, now U.S. Patent No. 2,869,036, issued January 13, 1959, and Serial No. 588,022, filed May 29, 1956, for Glow Discharge Device.

The above-mentioned copending applications disclose various gaseous discharge devices which are comprised, typically, of a plurality of iterative series of electrodes separated from a common electrode by an ionizable medium. The electrodes may be either internal or external with respect to the ionizable medium envelope. A plurality of separated gaseous discharges may be maintained simultaneously in such a device by the application of an alternating potential between the common electrode and a selected first series of the iterative electrodes. These gaseous discharges may be shifted to adjacent electrodes in a second iterative series by the application to that iterative series of the alternating potential. The alternating potential first applied is then removed from the first iterative series of electrodes.

The existence or non-existence of gaseous discharges at consecutive electrodes of a selected series of iterative electrodes may be utilized to indicate a binary word. For example, in an iterative series having four electrodes, the existence of gaseous discharges at only the first and fourth electrodes may be utilized to indicate the binary word 1001 if gaseous discharges are employed to correspond to the binary digit "1." Conversely, if gaseous discharges are employed to represent the binary digit "0," the above-described display would represent the binary word 0110.

The control of the shifting of gaseous discharges is based on the principle of priming. A primed electrode may be defined as an electrode that is separated from a common electrode by an ionizable medium which is partially ionized by the existence of a gaseous discharge in another portion of the ionizable medium, so that a gaseous discharge may be initiated by the existence between the primed electrode and the common electrode of a sustaining potential difference. A sustaining potential may be defined as any potential difference between the breakdown potential and the extinction potential of a gaseous discharge device under the conditions of its excitation. The breakdown potential is that potential difference which must exist between an unprimed electrode and a common electrode in order to initiate a gaseous discharge between these electrodes. The extinction potential is the potential difference between two electrodes at which a gaseous discharge existing between the electrodes will die out. The extinction potential is, of course, less than the breakdown potential for a given set of conditions.

It is an object of the invention to increase the maximum speed of operation of gaseous discharge devices.

Another object of the invention is to shift existing discharges in a gaseous discharge device by selective control of quench potentials.

Another object of the invention is to improve known systems for operating gaseous discharge devices.

According to the invention, a high frequency energizing potential is applied to the common electrode and quench potentials are selectively applied to the iterative electrode systems of a gaseous discharge device. A quench potential may be defined as a potential which, when applied to an electrode, causes the charged ionizable medium particles, which make up the discharge residue, to be swept to the electrodes, in the case of internal electrodes, or to the vessel walls, in the case of external electrodes, without causing substantial new ionization in the process.

Assume that an energizing potential of high frequency (H.-F.), that is, one whose frequency is greater than about 20,000 cycles per second, is applied to a common electrode of a gaseous discharge device having iterative electrodes. The magnitude of the applied energizing potential is such that a gaseous discharge exists between a first electrode and a common electrode only if the first electrode is primed, that is, the energizing potential is in the sustaining potential range. The physical parameters of the device, the gas composition and pressure and the electrode area and spacing, are such that an adjacent second electrode is primed by the gaseous discharge existing between the first electrode and the common electrode. However, a quench potential is applied to the second electrode thereby sweeping out the charged particles and inhibiting a discharge between the second electrode and the common electrode. If the quench potential is removed from the second electrode, a discharge will occur between the second electrode and the common electrode. If the quench potential is then applied to the first electrode, the gaseous discharge existing between the first electrode and the common electrode is extinguished. The gaseous discharge is therefore shifted from the first electrode to the second electrode. Shifting the gaseous discharge to a third electrode is accomplished by a process similar to the process by which the discharge was shifted to the second electrode. If no discharge exists between the first electrode and the common electrode, then the process just described will be completed without initiating a discharge between any of the three electrodes and the common electrode.

Energizing and quench voltages and frequencies are dependent on the physical characteristics of the gaseous discharge device as discussed in the above-mentioned copending applications Serial No. 588,021 and Serial No. 588,022. In the present state of the art, mathematical determination of these values is difficult, if not presently impossible. Thus they are most readily determined by routine testing. For example, energizing generators using readily obtainable components can be conveniently designed to have an output voltage of about 150 volts. In general, the higher the frequency of the energizing potential the lower the sustaining potential for a given physical construction of a gaseous discharge device. Thus, for a chosen output voltage the frequency of the energizing generator may be raised until this voltage is in the sustaining potential range for the particular device. Similarly, an alternating quench potential generator may be adjusted by applying its output to a sustained discharge and varying the frequency for extinction or maximum visual constriction of the discharge. In the latter case, the amplitude of the output voltage is then adjusted for complete extinction of the discharge. In the case of direct quench potentials, the direct potential is merely adjusted for extinction of the discharge.

The gas chosen to compose the ionizable medium is selected with respect to the various other circuit parameters. The easiest gas to quench is one with a high ionization potential and high values of electron and ion mobility. Conversely, the gas in which a discharge is most readily maintained, resulting in the lowest power consumption, is one with a low ionization potential and a low value of ionic diffusion coefficient. For example, the most efficient of the noble gases, helium, neon, argon, krypton, and xenon, which as an extinction time which will permit the required speed of operation, may be selected for the ionizable medium.

Further according to the invention, it has been found that with some electrode configurations and under some conditions of excitation the value of the potential applied to the electrode array from which the quench potential is removed is other than zero for optimum speed of operation and lowest power consumption. Thus, a potential which may be defined as a "pass potential" may advantageously be applied to the electrode array as the quench potential is removed. The pass potential may conveniently be of the same frequency as the quench potential and its optimum value may be determined by routine testing for maximum reliable shifting speed.

In order that the invention may be practiced readily by others, it will be described in terms of express embodiments, given by way of illustration only, and with reference to the accompanying drawing in which:

Fig. 1 is a functional diagram of an embodiment of the invention utilizing a single quench potential and a gaseous discharge device having internal electrodes;

Fig. 2 is a functional diagram of an alternative embodiment of the invention utilizing quench and pass potentials and a gaseous discharge device having internal electrodes;

Fig. 3 is a functional diagram of an alternative embodiment of the invention utilizing a gaseous discharge device having external electrodes.

Referring now to Fig. 1, there is shown an embodiment of the invention in which a gaseous discharge device whose electrodes are in direct physical contact with the ionizable medium of the device may be utilized as a shift register. The discharge device 10 includes an ionizable medium 11 and a common electrode 12. The common electrode 12 may be either a single electrode as illustrated or a plurality of electrodes connected together.

An energizing potential generator 13 generates the high frequency potential. Such generators are well known in the art, and a satisfactory generator of this type is disclosed in Fig. 7 of the above-mentioned copending application Serial No. 588,021, providing that the terminal of the output transformer shown in said Fig. 7 as 162 is connected to the common connection 15 of Fig. 1 of the drawing herein.

A keep alive electrode 16 serves to maintain a continuous gaseous discharge in the device 10 and prime an information input electrode 17. An information input circuit 18 applies information signals to an information pulse generator 19. The information supplied by the information input 18 may come, for example, from a digital computer in the form of voltage pulses. The output of the pulse generator 19 is applied to the information input electrode 17. The application of an information signal to the information pulse generator 19 causes the removal from the information input electrode 17 of the quench potential normally applied by the information pulse generator 19, thereby initiating a discharge between the information input electrode 17 and the common electrode 12. The pulse generator 19 may produce either a direct or alternating potential. The actual potential and frequency must be determined with respect to the other characteristics of the circuit, such as electrode spacing, nature of the ionizable medium, and the potential applied to the common electrode. Such pulse generators are well known in the art, and a satisfactory direct potential pulse generator is disclosed in Fig. 2.33 of Electronics by Elmore and Sands, National Nuclear Energy Series, Division V—Volume I, McGraw-Hill, 1949.

A common lead 20 connects a first series of iterative transfer electrodes 21, 22, 23, 24, 25, 26, 27. Similarly, a common lead 30 connects a second series of iterative transfer electrodes 31, 32, 33, 34, 35, 36, 37; and a common lead 40 connects a third series of iterative transfer electrodes 41, 42, 43, 44, 45, 46, 47. An output electrode 50 is situated so as to detect the presence of a discharge between the third iterative series electrode 47 and the common electrode 12. Alternatively, the detection of a discharge may be accomplished by any other suitable means such, for example, as those illustrated in the aforesaid copending applications.

A quench potential generator 60 provides a quench potential which is selectively applied to the iterative electrode series. The quench potential generator 60 may furnish either an alternating or a direct potential. If an alternating quench potential is employed, the quench potential generator 60 may be of the same form as the energizing potential generator 13 discussed above. For proper operation of the invention the outputs of the energizing and quench potential generators must be by-passed with respect to one another; in other words, the output of the energizing potential generator must present a low impedance to the quench frequency and the output of the quench potential generator must present a low impedance to the energizing frequency. If a direct quench potential is employed, the quench potential generator 60 may be any well-known direct potential source with suitable by-passing for the high frequency energizing potential. The output of the quench potential generator 60 is applied to a first commutator 61 which includes three brushes 62, 63, 64 and an armature 65. The common lead 20 may be connected to the quench potential generator 60 through the first commutator armature 65 and the brush 62. The common lead 30 may be connected to the quench potential generator 60 through the first commutator armature 65 and the brush 63. The common lead 40 may be connected to the quench potential generator 60 through the first commutator armature 65 and the brush 64.

When any of the common leads 20, 30, 40 is not connected to the quench potential generator 60, a second commutator 71 connects that common lead to the common connection 15 through the respective one of brushes 72, 73, and 74 associated therewith.

As is shown in Fig. 1, the first commutator armature 65 and the second commutator armature 75 are related as follows: (1) the first commutator armature 65 covers an arc of 240° and the second commutator 75 covers an arc of 120°; (2) the first commutator armature 65 and the second commutator armature 75 are connected together through a connecting and timing shaft 79 so that a circuit from each of the common leads 20, 30, and 40 to the common connection 15 is always made through one or the other, but not both, of the commutators 61 and 71.

The energizing potential applied to the common electrode 12 and the potential applied to the common leads 20, 30, and 40 through the commutators 61 and 71 are related as follows: (1) at the frequency and potential applied to the common electrode 12, the quench potential applied to any electrode by the quench potential generator 60 through the respective one of the common leads 20, 30, and 40 extinguishes a discharge existing between the electrode to which the quench potential is applied and the common electrode 12; (2) the potential difference existing between an iterative electrode and the common electrode 12 is in the sustaining voltage range when the respective one of the common leads 20, 30, and 40, to which the iterative electrode is connected, connects that lead to the common connection 15 by means of the commutator 71.

The commutators 61 and 71 are driven in synchronism with the information source 18 by a driving means shown as a motor 80. Systems of synchronizing the registration of information with the operation of other system components are particularly well known in the computer art, and such systems are disclosed in the aforesaid copending applications. For example, the leads 20, 30 and 40 may correspond to the leads 20, 21, and 22 of the timing system illustrated in Fig. 5 of the aforesaid copending application Serial No. 588,022. It is therefore to be understood that the timing system shown in Fig. 1 is given by way of illustration only, in order that the operation of the timing cycle of the invention may be more readily understood.

The keep alive electrode 16 is directly connected to the common connection 15. The placement of electrode 16 is such that a continuous discharge exists between the keep alive electrode 16 and the common electrode 12. Alternative methods of achieving the required continuous discharge are illustrated in the aforesaid copending applications.

Assume that the timing system is so synchronized that information signals from the information source 18 arrive at the information pulse generator 19 at the time when the commutators 61 and 71 have rotated 120° clockwise from the positions shown in Fig. 1. Assume that the information pulse generator 19 is in its high voltage state prior to application of the information signal, thereby applying a quench potential to the information input electrode 17. Application to the information pulse generator 19 of an information signal having the desired predetermined characteristics causes the information pulse generator 19 to shift to its low voltage state, thereby removing the quench potential which normally exists between the common electrodes 12 and the information input electrode 17. The information input electrode 17 is primed by the discharge between the keep alive electrode 16 and the common electrode 12. Thus the removal from the information input electrode 17 of the quench potential causes a discharge to be initiated between the information input electrode 17 and the common electrode 12. This gaseous discharge will continue to exist until the quench potential is reapplied to the information input electrode 17 by the information pulse generator 19. In this embodiment, the circuit parameters of the information pulse generator 19 are preferably selected so that, upon energization of the pulse generator 19 in response to an information signal, the quench potential is removed from the information input electrode 17 until the second commutator armature 75 connects the common lead 40 to the common connection 15. This timing sequence insures initiation of a gaseous discharge between the first iterative series first electrode 21 and the common electrode 12, as is hereinafter described, and also allows sufficient time for the extinction of the gaseous discharge between the information input electrode 17 and the common electrode 12 prior to the occurrence of the next succeeding information signal interval.

With reference to the position as shown in Fig. 1, rotation of the first armature 65 clockwise through an arc of 120° causes a quench potential to be applied to the common leads 30 and 40, thereby extinguishing any discharges existing between the electrodes connected thereto and the common electrode 12. Similarly, an initial rotation of the second armature 75 clockwise through an arc of 120° connects the common connection 15 to the common lead 20 so that gaseous discharges may exist between the common electrode 12 and those electrodes connected to the common lead 20 which have been primed. If a gaseous discharge exists between the information input electrode 17 and the common electrode 12, this gaseous discharge primes the first iterative series first electrode 21. A gaseous discharge is therefore initiated between the first iterative series first electrode 21 and the common electrode 12.

The clockwise rotation of the first armature 65 through a second arc of 120° causes a quench potential to be applied to the common leads 20 and 40, thereby extinguishing any discharges existing between the electrodes connected thereto and the common electrode 12, and removes the quench potential from the common lead 30. Rotation of the second armature 75 clockwise through the same second arc of 120° connects the common connection 15 to the common lead 30 so that gaseous discharges may exist between the common electrode 12 and those electrodes connected to the common lead 30 which have been primed. A gaseous discharge existing between the first iterative series first electrode 21 and the common electrode 12 primes the second iterative series first electrode 31, and a gaseous discharge is therefore initiated between the second iterative series first electrode 31 and the common electrode 12.

The rotation of the first armature 65 clockwise through a third arc of 120° causes a quench potential to be applied to the common leads 20 and 30, thereby extinguishing any gaseous discharges existing between the electrodes connected thereto and the common electrode 12, and removes the quench potential from the common lead 40. The rotation of the second armature 75 clockwise through a third arc of 120° connects the common connection 15 to the common lead 40 so that gaseous discharges may exist between common electrode 12 and the electrodes connected to the common lead 40 which have been primed. A gaseous discharge existing between the first iterative series second electrode 31 and the common electrode 12 primes the third iterative series first electrode 41, and a gaseous discharge is therefore initiated between the third iterative series first electrode 41 and the common electrode 12.

The armatures 65 and 75 have now completed one cycle, and a gaseous discharge has been shifted from the information input electrode 17 to the third iterative series first electrode 41. Repetition of the cycle shifts the discharge successively to the first iterative series second electrode 22, the second iterative series second electrode 32, and the third iterative series second electrode 42. Continued cycling shifts the discharge to the third iterative series final electrode 47, where its existence is detected by means of the output electrode 50.

In order to more fully describe the operation of the device of Fig. 1, a specific example of this operation will now be given. Assume it is desired to enter and read out the binary word 1001. Assume, in addition, that a a binary code is to be used in which the presence of a gaseous discharge at a selected electrode represents the binary digit "1" (or unit) and the absence of a gaseous discharge at a selected electrode indicates the binary digit "0" (or naught). At time $t_0$, the only gaseous discharge existing in the device is the keep alive discharge, and the commutator armatures 65 and 75 are in the positions as shown in Fig. 1.

At time $t_1$, the commutator armatures 65 and 75 have rotated 120° clockwise from the positions shown in Fig. 1, and an information pulse representing the binary digit "1" is received from the information input 18 by the information pulse generator 19, causing the information pulse generator 19 to change to its astable state and remove the quench potential from the information input electrode 17. The gaseous discharge thereby initiated primes the first iterative series first electrode 21. Also at time $t_1$, the rotation of the commutator armatures 65 and 75 removes the quench potential from the first iterative series electrodes 21–27, and a gaseous discharge is initiated at the primed first iterative series first electrode 21, which discharge primes the second iterative series first electrode 31. Quench potentials are applied to the second iterative series electrodes 31–37 and the third iterative series electrodes 41–47 during time interval $t_1$. At time $t_2$, the commutator armatures 65 and 75 rotate another 120° clockwise, thereby removing the quench potential from the second iterative series electrodes 31–37 and a gaseous discharge is initiated at the second iterative series first electrode 31. Quench potentials are applied to the first iterative series electrodes 21–27 and the third iterative series electrodes 31–37 during time interval $t_2$. At the end of time interval $t_2$, the information pulse generator returns to its stable state, thereby applying a quench potential to the information input electrode 17 which extinguishes the gaseous discharge existing at the information input electrode 17. At time $t_3$, the commutator armatures 65 and 75 rotate another 120° clockwise, thereby reaching the positions shown in Fig. 1, and applying quench potentials to the first iterative series electrodes 21–27 and the second iterative series electrodes 31–37, and removing the quench potential from the third iterative series electrodes 41–47. As the gaseous discharge existing at the second iterative series first electrode 31 during time $t_2$ primes the third iterative series first electrode 41, a gaseous discharge is therefore initiated at a third iterative series first electrode 41, which discharge primes the first iterative series second electrode 22. Thus, at the end of the first digit interval, times $t_1$–$t_3$, a gaseous discharge representing a binary "1" stands at the third iterative series first electrode 41.

At time $t_4$, the information input 18 applies a binary "0" to the information pulse generator 19. Since the binary code used calls for a discharge to be initiated only to represent a binary "1," no discharge is initiated at the information input electrode 17. The commutator armatures 65 and 75 rotate 120° clockwise from their positions shown in Fig. 1, and quench potentials are applied to the second iterative series electrodes 31–37 and the third iterative series electrodes 41–47. The quench potential is removed from the first iterative series electrodes 21–27, and a gaseous discharge is initiated at the first iterative series second electrode 22, thereby priming the second iterative series second electrode 32. No discharge is initiated at the first iterative series first electrode 21 as no discharge exists at the information input electrode 17 to prime the first iterative series electrode 21. At time $t_5$, the commutator armatures 65 and 75 rotate another 120° clockwise, and quench potentials are applied to the first iterative series electrodes 21–27 and the third iterative series electrodes 41–47. The quench potential is removed from the second iterative series electrodes 31–37, and a gaseous discharge is initiated at the second iterative series second electrode 32, thereby priming the third iterative series second electrode 42. No other gaseous discharges are initiated in the device 10, as no other electrodes in the iterative series 31–37 are primed. At time $t_6$, the commutator armatures 65 and 75 rotate another 120° clockwise, thereby assuming the position shown in Fig. 1, and quench potentials are applied to the first iterative series electrodes 21–27 and the second iterative series electrodes 31–37. The quench potential is removed from the third iterative series electrodes 41–47, and a discharge is initated at the third iterative series second electrode 42, thereby priming the first iterative series third electrode 23. Thus, at the end of the second digit interval, times $t_4$ to $t_6$, a gaseous discharge representing a binary 1 stands at the third iterative series second electrode 42, while no gaseous discharge exists at the third iterative series first electrode 41, thereby representing a binary zero at said electrode 41. Thus, a value standing in the device at time $t_6$ is 01.

At time $t_7$, the commutator armatures 65 and 75 rotate 120° clockwise, thereby assuming the positions shown in Fig. 1, and the information input 18 applies a binary "0" for the information pulse generator 19. Since the binary code used calls for a discharge to be initiated only to represent a binary "1," no discharge is initiated at the information input electrode 17. The rotation of the commutator armatures 65 and 75 causes quench potentials to be applied to the second iterative series electrodes 31–37 and the third iterative series electrodes 41–47. The quench potential is removed from the first iterative series electrodes 21–27, and a gaseous discharge is initiated at the first iterative series third electrode 23, thereby priming the second iterative series third electrode 33. No discharge is initiated at either the first iterative series first electrode 21 or the first iterative series second electrode 22 since neither of these electrodes 21 and 22 was primed during the preceding time interval $t_6$. At time $t_8$, the commutator armatures 65 and 75 rotate another 120° clockwise, and quench potentials are applied to the first iterative series electrodes 21–27 and the third iterative series electrodes 41–47. The quench potential is removed from the second iterative series electrodes 31–37, and a gaseous discharge is initiated at the second iterative series third electrode 33, thereby priming the third iterative series third electrode. No other gaseous discharges are initiated in the device 10, as no other electrodes in the iterative series 31–37 have been primed. At time $t_9$, the commutator armatures 65 and 75 rotate another 120° clockwise, thereby assuming the positions shown in Fig. 1, and quench potentials are applied to the first iterative series electrodes 21–27 and a second iterative series electrodes 31–37. The quench potential is removed from the third iterative series electrodes 41–47, and a gaseous discharge is initiated at the third iterative series third electrode 43, thereby priming the first iterative series fourth electrode 24. Therefore, at the end of the third digit interval, times $t_7$–$t_9$, a gaseous discharge representing a binary "1" stands at the third iterative series third electrode 43, while no gaseous discharges exist at either the third iterative series first electrode 31 or the third iterative series second electrode 32, thereby representing a binary "0" at each of these two latter electrodes 31 and 32. Thus, the value standing in the device at time $t_9$ is the binary number 001.

At time $t_{10}$, the commutator armatures 65 and 75 rotate 120° clockwise from the positions shown in Fig. 1, and the information input 18 applies a binary "1" to the information pulse generator 19, causing the information pulse generator 19 to change to its astable state, thereby removing the quench potential from the information input electrode 17. The resulting gaseous discharge at the information input electrode 17 primes the first iterative series first electrode 21. The rotation of the commutator armatures 65 and 75 at time $t_{10}$ applies quench potentials to the second iterative series electrodes 31–37 and the third iterative series electrodes 41–47. The quench potential is removed from the first iterative series electrodes 21–27, and gaseous discharges are initiated at the primed first iterative series first and fourth electrodes 21 and 24. The gaseous discharge at the first iterative series first electrode 21 primes the second iterative series first electrode 31 and the gaseous discharge at the first iterative series fourth electrode primes the second iterative series fourth electrode 34. No gaseous discharges are initiated at the first iterative series second and third electrodes 22 and 23, as these electrodes 22 and 23 are not primed. At time $t_{11}$, the commutator armatures 65 and 75 rotate another 120° clockwise, and quench potentials are applied to the first iterative series electrodes 21–27 and the third iterative series electrodes 41–47. The quench potential is removed from the second iterative series electrodes 31–37, and gaseous discharges are initiated at the primed second iterative series first and fourth electrodes 31 and 34. The gaseous discharge at the second iterative series first electrode 31 primes the third iterative series first electrode 41, and the gaseous discharge at the second iterative series fourth electrode 34 primes the third iterative series fourth electrode 44. At time $t_{12}$, the commutator armatures 65 and 75 rotate another 120° clockwise, thereby assuming the positions shown in Fig. 1, and quench potentials are applied to the first iterative series electrodes 21–27 and the second iterative series electrodes 31–37. The quench potential is removed from the third iterative series electrodes 41–47, and gaseous discharges are initiated at the primed third iterative series first and fourth electrodes 41 and 44. The gaseous discharge at the third iterative series first electrode 41 primes the first iterative series second electrode 22, and the discharge at the third iterative series fourth electrode 44 primes the first iterative series fifth electrode 25. Thus, at the end of the fourth digit interval, times $t_{10}$ to $t_{12}$, gaseous discharges, each representing a binary "1," exist at the third iterative series first electrode 41 and the third iterative series fourth electrode 44. Binary "0's" are represented by the absence of gaseous discharges at the third iterative series second electrode 42 and the third iterative series third electrode 43. Thus, at time $t_{12}$, the value standing in the device 10 is the binary word 1001.

It is apparent that, considering all of the third series iterative electrodes 41–47, the actual value standing in the device 10 at time $t_{12}$ is the binary word 1001000, the three consecutive zero digits corresponding to the absence of discharges at the third iterative series fifth, sixth, and seventh electrodes 45, 46, and 47. Therefore, the capacity of the device 10 of Fig. 1 is a seven digit binary word. If the commutator armatures 65 and 75 are rotated clockwise a total of 360° during times $t_{13}$ to $t_{15}$, corresponding to the fifth digit interval, the value standing in the register at time $t_{15}$ will be the binary word 0100100. The rotation of the armatures 65 and 75 clockwise a total of 360° during times $t_{16}$ to $t_{18}$, corresponding to the sixth digit interval, leaves the binary word 0010010 standing in the device 10 at time $t_{18}$. The rotation of the armatures clockwise a total of 360° during the seventh digit interval, times $t_{19}$ to $t_{21}$, leaves the binary word 0001001 standing in the device 10 at time $t_{21}$. At time $t_{21}$, the output electrode 50 detects the existence of a gaseous discharge at the third iterative series seventh electrode 47. This discharge corresponds to the discharge initiated at the information input electrode 17 during the time interval $t_1$. Therefore, it is apparent that the device 10 of Fig. 1 introduces a storage delay of seven digit intervals when operated as described. Continued operation as previously described will result in the binary digit "0" being detected by the output electrode 50 during the eigth digit interval and during the ninth digit interval. During the tenth digit interval, the output electrode 50 will detect the binary digit "1" corresponding to the binary digit "1" entered at the information input electrode 17 at time $t_{10}$. The output of the device 10 during the digit intervals 7–10 is therefore the binary word 1001.

Since a gaseous discharge is entered, shifted, and detected, only after a proper input signal is applied in a predetermined time sequence, the output means detects the presence or absence of such a signal applied in proper sequence, and the device therefore acts as a storage and shifting register. It is to be understood that a discharge may be entered into the device once during each cycle. The storage and shifting capacity of the system is therefore equal to the number of electrodes in one of the iterative arrays. The delay introduced by the device 10 when operated as described above is equal to the number of iterative electrodes in a series. Delays other than seven digit intervals may be introduced by changing the number of iterative electrodes in a series. Such a change also alters the capacity of the device correspondingly. Delays greater than the number of electrodes in an iterative series may be introduced by stopping the rotation of the commutator armatures 65 and 75 for a selected number of digit intervals. The device 10 may be operated as a "single-end" storage by shifting discharges into the device utilizing clockwise rotation of the commutator armatures 65 and 75, terminating rotation for the desired number of digit intervals, and then reading out the stored binary word by rotating the commutator armatures 65 and 75 in a counterclockwise direction. Such single-ended operation requires the output electrode to be relocated at the desired readout point along the channel of the ionizable medium.

Referring now to Fig. 2, there is shown an alternative embodiment of the invention. The circuitry of Fig. 2 is similar to the circuitry of Fig. 1. However, a pass potential generator 70 is inserted between the second commutator 71 and the common connection 15. Elements of Fig. 1 and Fig. 2 which are identical bear the same numbers.

In the device illustrated in Fig. 2, the energizing potential applied to the common electrode 12 and the potentials applied to the common leads 20, 30, 40, through the commutators 61 and 71 are related as follows: (1) at the frequency and potential applied to the common electrode 12, the quench potential applied to any electrode by the quench potential source 60 through one of the common leads 20, 30, and 40 extinguishes a discharge existing between that electrode to which it is applied and the common electrode 12; (2) at the frequency and potential applied to the common electrode 12, the pass potential applied to any primed electrode by the pass potential source 70 through one of the common leads 20, 30, and 40 allows the initiation of a gaseous discharge between that electrode to which it is applied and the common electrode 12; (3) the frequency and potential applied to the common electrode 12 are such that a gaseous discharge occurs between the common electrode 12 and an electrode connected to the common connection 15 to which the pass potential is applied if the ionizable medium associated therewith is primed, but not otherwise.

The sequence of operation of the system of Fig. 2 is the same as the sequence of operation previously described with respect to Fig. 1.

Referring now to Fig. 3, there is shown an embodiment of the invention utilizable with a gaseous discharge device having external electrodes. Components in Fig. 3 corresponding in function to, but not identical with components of Fig. 2 are designated by the addition of a prime to the reference number. In this embodiment, as in the embodiment of Fig. 2, a pass potential generator 70 is connected between the second commutator 71 and the common connection 15. If the system is to be used for shifting of discharges only, the quench and pass potential may be either direct or alternating potentials. If the system is to be used for both shifting and storage, an alternating potential must be furnished by the quench potential source 60 and the pass potential source 70, as the physical contact between the iterative electrodes and the ionizable medium 11 necessary to hold discharges if direct potentials are utilized does not exist.

The invention claimed is:

1. A gaseous discharge information registering system comprising: a gaseous discharge device having a priming electrode, an input electrode, first, second, and third iterative arrays of transfer electrodes and means forming a common electrode; a generator of an energizing potential of constant amplitude; a circuit for continually applying the energizing potential between said means forming a common electrode and each of the other electrodes for sustaining gaseous discharges; means for establishing a gaseous discharge at said input electrode, a generator of quenching potential of frequency characteristic different from that of said energizing potential; means for establishing a gaseous discharge at the first one of the electrodes of said first array of transfer electrodes in response to the gaseous discharge at said input electrode including means for normally applying the quenching potential to said first and second arrays of transfer electrodes for preventing the establishment of gaseous discharges and for extinguishing established gaseous discharges thereat; and cyclically operable means for shifting said established glow discharge to a next adjacent electrode of said first array of transfer electrodes during each cycle of operation of the shifting means, said shifting means comprising: means for removing the quenching potential from said first array and for applying the quenching potential to said second and third arrays during a first predetermined interval of the shifting cycle, means for removing the quenching potential from said second array and for applying the quenching potential to said first and third arrays during a second predetermined interval of the shifting cycle; and means for removing the quenching potential from said third array and for reapplying the quenching potential to said first and second arrays during a third predetermined interval of the shifting cycle.

2. A gaseous discharge information registering system comprising: a gaseous discharge device having a priming electrode, an input electrode, at least six transfer electrodes and means forming a common electrode; a circuit connecting said transfer electrodes in at least three iterative arrays; a quenching potential generator; means for normally applying the quenching potential to at least two of said iterative arrays for preventing the establishment of gaseous discharges and for extinguishing established gaseous discharges at the transfer electrodes to which the quenching potential is applied; a generator of energizing potential of constant amplitude and frequency characteristic different from that of said quenching potential; a circuit for continually applying the energizing potential between said means forming a common electrode and each of the other electrodes for maintaining gaseous discharges established at transfer electrodes from which the quenching potential is absent; means for applying information representing pulses to said input electrode to establish information representing gaseous discharges in said device; and means for shifting said information representing discharges including means for removing said quenching potential from each of said arrays of transfer electrodes in sequence.

3. In a gaseous discharge shift register, the combination of: a discharge channel containing an ionizable medium; means forming an energizing electrode positioned adjacent said channel; first, second, and third arrays of a plurality of transfer electrodes in sequentially alternate arrangement along said channel and in discharge sustaining relation to said energizing electrode; means for establishing a discharge at a given electrode of the first array of transfer electrodes including a priming electrode, an input electrode, and means for continually applying a constant amplitude gaseous discharge sustaining potential between said means forming an energizing electrode and each of the other electrodes; a quenching potential generator, the quenching potential being of different frequency characteristic than that of said energizing potential and effective upon application to said electrodes to prevent the establishment of gaseous discharges and to extinguish established discharges thereat; means for normally applying the quenching potential to said input and said first and second arrays of transfer electrodes; means for establishing a gaseous discharge at said input electrode; and cyclically operable means for shifting each established gaseous discharge to the initial transfer electrode of said first array and to a next adjacent electrode of said each array of transfer electrodes during each cycle of operation of the shifting means, said shifting means comprising: means for removing the normally applied quenching potential from the first array of transfer electrodes for a first predetermined interval of said shifting cycle; means for removing the normally applied quenching potential from said second array of transfer electrodes for a second predetermined interval of said shifting cycle; and means for applying the quenching potential to said third array of transfer electrodes substantially throughout said first and second intervals of said shifting cycle.

4. A gaseous discharge information registering system comprising: means forming a common electrode; a priming electrode, an information input electrode, an output electrode, a plurality of transfer electrodes interposed between said input and said output electrodes and connected in iterative arrays; an ionizable medium positioned to provide a gaseous discharge path between said common electrode means and the other electrodes; a generator of energizing potential of constant amplitude and given frequency; a circuit for continually applying the energizing potential between said common electrode means and each of the other electrodes for sustaining gaseous discharges; a generator of quenching potential of frequency different from said given frequency; the quenching potential being effective upon application to said transfer electrodes to prevent the establishment of gaseous discharges and to extinguish established gaseous discharges thereat; a source of pass potential, the pass potential being effective upon application to said transfer electrodes to allow the establishment of a gaseous discharge thereat; a source of input signals connected to said input electrode for initiating a gaseous discharge in said ionizable medium in response to an input signal; and timing and coupling means connected to said quenching potential generator, said pass potential source, and said signal input means for periodically applying said pass potential to said iterative arrays in sequence and for applying said quenching potential to said iterative arrays in the absence of said pass potential, thereby to shift existing discharges through successive electrodes of the iterative arrays.

5. A gaseous discharge information registering system comprising: means forming a common electrode; a priming electrode, an input electrode and a plurality of transfer electrodes spaced from said means forming a common electrode; an ionizable medium positioned to provide a discharge path between said electrodes and said means forming a common electrode; a generator of energizing potential of constant amplitude and given frequency; a circuit for continually applying the energizing potential between said means forming a common electrode and each of the other electrodes; means for establishing information representative gaseous discharges at said input electrode; and means for shifting the established gaseous discharges including a generator of quenching potential of frequency different from said given frequency; and means for selectively applying the quenching potential between said input and transfer electrodes and said common electrode.

References Cited in the file of this patent
UNITED STATES PATENTS

| | | |
|---|---|---|
| 2,049,763 | De Forest | Aug. 4, 1936 |
| 2,658,142 | St. John | Nov. 3, 1953 |
| 2,783,415 | Thomas et al. | Feb. 26, 1957 |
| 2,787,729 | Sternbeck et al. | Apr. 2, 1957 |
| 2,845,578 | Adams | July 29, 1958 |
| 2,849,655 | Adams | Aug. 26, 1958 |
| 2,859,385 | Bentley | Nov. 4, 1958 |
| 2,892,968 | Kallmann et al. | June 30, 1959 |